March 31, 1970  BO INGEMAR ACKERFELDT  3,503,428
LOG SAWMILL

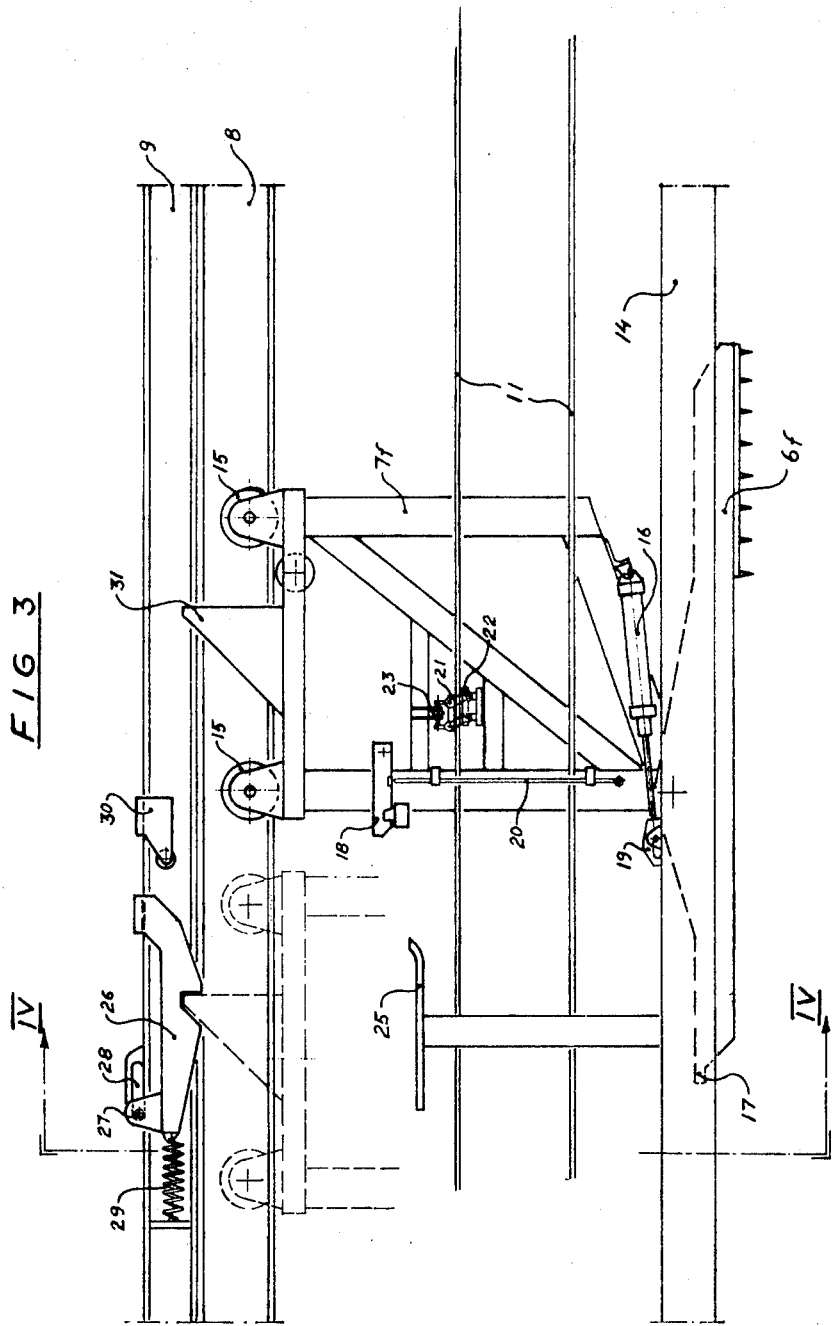

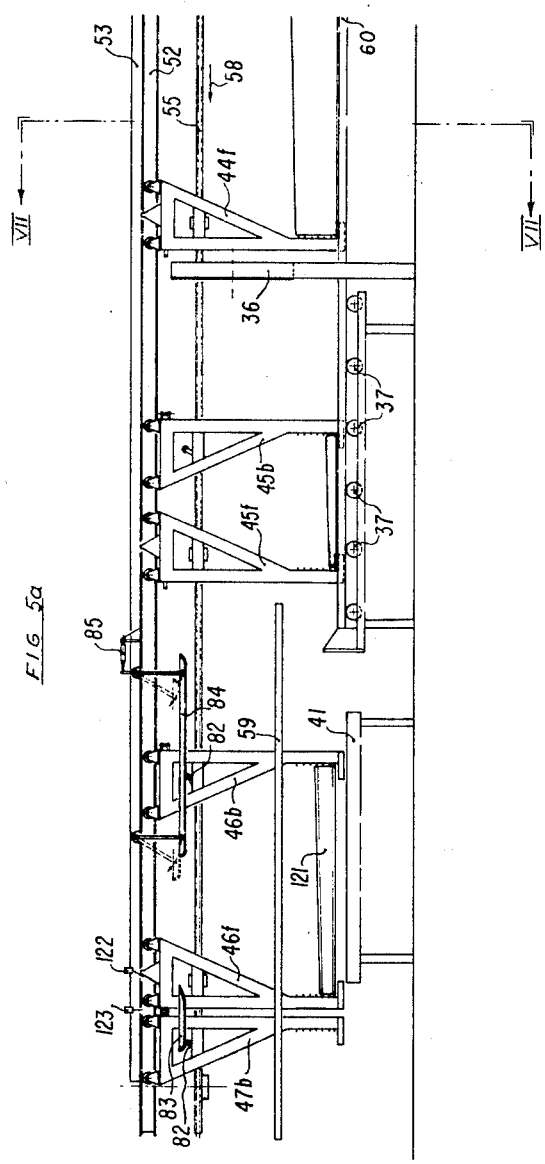

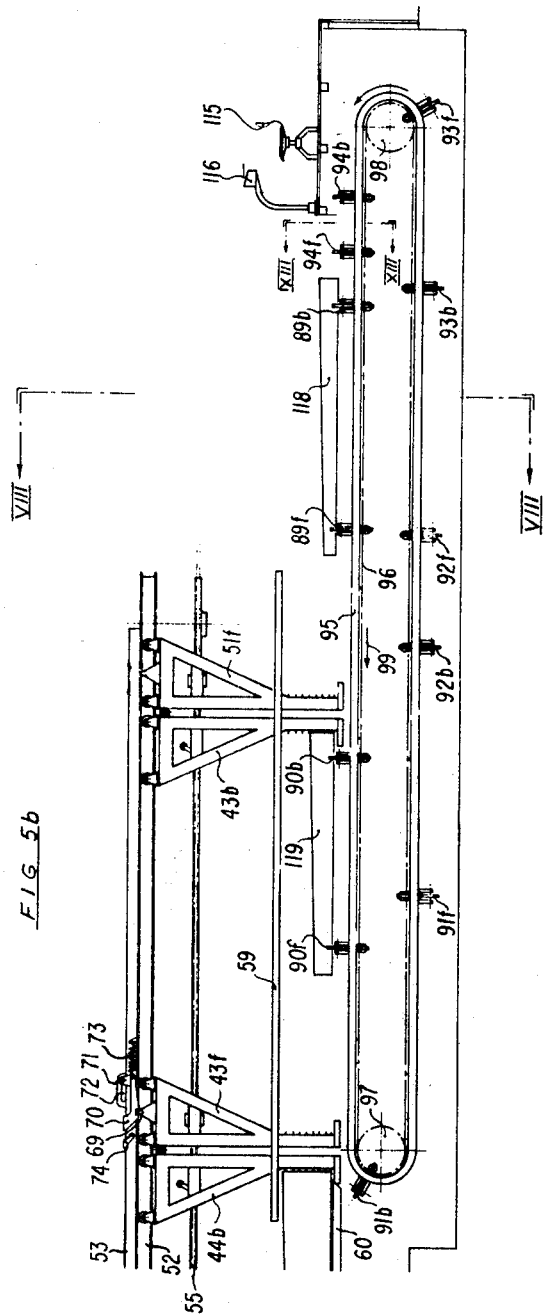

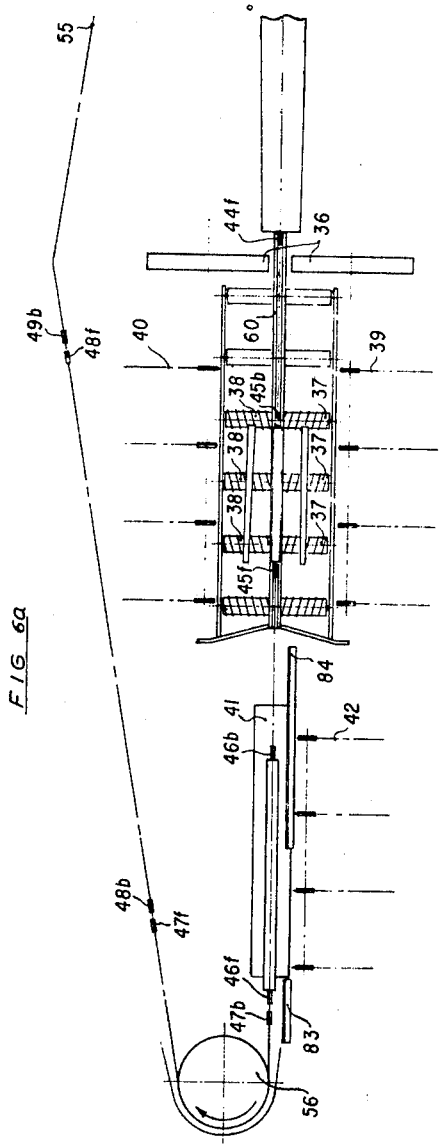

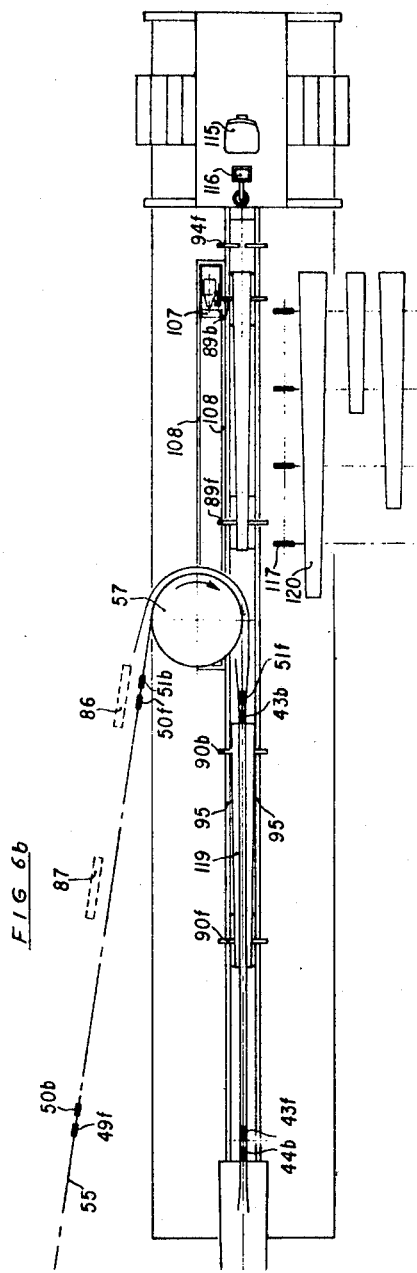

Filed Nov. 10, 1965  11 Sheets-Sheet 9

United States Patent Office 3,503,428
Patented Mar. 31, 1970

3,503,428
LOG SAWMILL
Bo Ingemar Ackerfeldt, 15 Rosornas Vag,
Danderyd, Sweden
Filed Nov. 10, 1965, Ser. No. 507,101
Claims priority, application Sweden, Oct. 5, 1965,
12,874/65
Int. Cl. B27b 29/04
U.S. Cl. 143—25                                    13 Claims

ABSTRACT OF THE DISCLOSURE

A log sawmill in which a log to be sawed is advanced along a sawing line from an input side of a saw unit to an output side of the unit by a log holding device which is movable along an overhead track.

---

Figure 1:
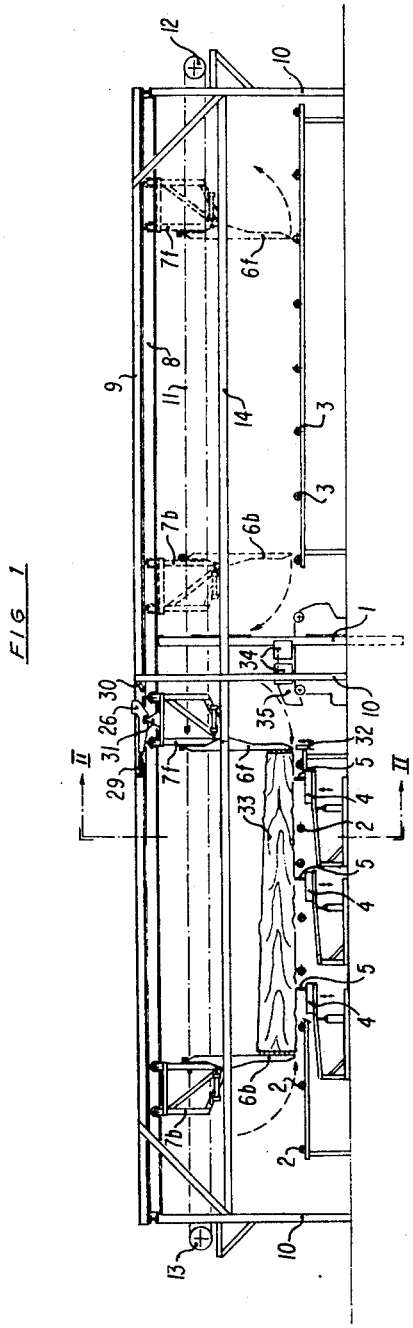

The present invention relates to a log sawmill and more particularly to a log sawmill comprising one or several saws, preferably band saw units, arranged one after the other along a sawing line and each having one or several saw-blades, and at least one log holding device, which is supported by and movable along an overhead track extending above the saw or saws parallel to the sawing line from the input side to the output side of the saw or saws. The sawing line means in this specification the preferred, straight line or path of movement from the input side to the output side of the sawmill for a log to be sawed in the sawmill. The log holding device includes two substantially vertical, downwardly extending log holding arms capable of engaging with their lower extremities the fore and the rear end surface respectively of a log disposed in the sawing line at the input side of the sawmill and to hold and support a log so engaged while moving the log in the sawing line from the input side through the saw or saws respectively to the output side and to release the log at the output side.

A sawmill of the type defined above has several important advantages. One advantage is due to the fact that the log holding device is engaging only the fore and rear end surfaces of the log, whereby one is free to position the cuts through the log in the most suitable and economical manner. In spite of this log holding device will guide the log very effectively during the sawing thereof so that accurate cuts can be made through the log. A log holding device of this type makes it also possible to use multiple-blade saws including several vertical saw-blades disposed side by side. Furthermore the sawmill can include several saws with one or several saw-blades arranged one after the other in the sawing line, whereby a plurality of cuts can be made through a log by feeding the log just once through the sawmill. Furthermore, the floor space below and around the saw or saws will be completely free from any devices for the feeding of the logs through the saw or saws, wherefore this floor space can be used for devices for supplying and aligning logs to be sawed and for removing logs already sawed. In order to reach a satisfactory production capacity of a sawmill of this type it is, however, essential that the logs can be fed through the saw or saws of the sawmill in an unbroken succession so that several logs are being sawed simultaneously, or at least that a new log can be aligned in the sawing line at the input side of the sawmill at the same time as a foregoing log is being sawed.

With this object the present invention provides a log sawmill of the type defined above, wherein the log holding device is movable from the input side to the output side with the lower extremities of the log holding arms disposed in the sawing line and is returnable from the output side to the input side with the lower extremities of the log holding arms moving at a substantial distance from the sawing line. In this way it is achieved that the log holding device will not, when returning from the output side to the input side, obstruct the sawing line through the saw or saws and will consequently not prevent that other logs are simultaneously being sawed or aligned in the sawing line. According to the invention this effect can be achieved in two different ways. According to one embodiment of the invention the log holding device is reciprocatingly movable to and fro along the overhead track extending above the saw or saws parallel to the sawing line from the input side to the output side, in which case the two log holding arms of the log holding device are swingable between a substantially vertical working position with their lower extremities lying in the sawing line and a raised position, in which the lower extremities of the log holding arms are disposed at a substantial distance above the sawing line. When a log has been fed through the saw and sawed therein, the log holding device can consequently be returned from the output side to the input side with the log holding arms in their raised position, whereby at the same time a new log can be aligned in the sawing line at the input side and may also be fed through the saw by means of other log feeding devices, as for instance feed rollers. This embodiment of the invention is preferred in particular for smaller sawmills, as it gives comparatively low investment costs. In the other embodiment of the invention, which is preferred in particular for large sawmills having a high production capacity, the overhead track for the log holding device is endless and forming a closed circuit for the log holding device comprising a first straight portion extending parallel to the sawing line from the input side to the output side and a second portion extending from the output side to the input side at the one side of the vertical plane comprising the sawing line. In this embodiment of the invention the sawmill can include a plurality of log holding devices movable one after another in the closed circuit formed by the endless track for the lock holding devices.

In the sawmills according to the invention of the type mentioned above there are, however, still some rather difficult problems, in particular regarding the log holding devices and the drive means for them. These components of the sawmill must be simple and light, economically acceptable and reliable in operation and must also have such a design that the high production capacity, which should theoretically be possible in a sawmill of this type, can be reached also in the practice. This requires above all that the logs can be supplied to and gripped by the log holding device at a high rate and in a manner suitable for automatization.

All these problems have been given a very satisfactory solution in a particularly advantageous embodiment of the invention, in which the fore and rear log holding arms in each log holding device are attached to each one separate log holding carriage supported by and individually movable along the overhead track for the log holding devices, and an endless drive member, for instance consisting of a line or a chain, is common to all log holding carriages and is running along the track for the log holding carriages, and at least the fore holding carriage in each log holding device is provided with means for alternatively connecting and disconnecting the carriage to and from the endless drive member.

Due to the fact that the two log holding arms of each log holding device are attached to two separate carriages, which are individually movable along the track and of which at least the forward one is disconnectable from the common drive line or drive chain, the log holding device obtains a very simple, light and cheap design. At the same time the advantage is achieved that logs of a very varying length can without difficulties be supported in the log holding device between the two log holding arms, and that the necessary gripping force applied by the log holding arms to the logs will be taken up by the common drive member, wherefore no additional members will be required for this purpose.

The gripping of a log between the two log holding arms in a log holding device according to the invention will be particularly fast and simple, if a resilient retaining member is arranged close to the track at the input side of the sawmill in the position intended for the feeding of new logs to the log holding device for engaging and retaining the fore log holding carriage against movement in the sawing direction together with means responsive to the retaining force for automatically releasing the carriage and for connecting it to the drive member, when the retaining force exceeds a predetermined value. The log holding carriage will be automatically connected to the drive member in a very simple manner, when released by the resilient retaining member, if the log holding carriage is provided with a coupling device operative between the carriage and the drive member, which coupling device is unidirectional and self-locking in such a way that it will automatically lock the carriage to the drive line or drive chain, when the carriage tends to move relative to the drive member in the sawing direction, while it permits a displacement of the carriage relative to the drive member in the opposite direction. Such a coupling device consists preferably of two clamp jaws, which are bearing directly against the drive line and are self-locking in the one direction of movement, or by two clamp jaws self-locking in a corresponding manner but bearing against a chain wheel mounted for rotation upon the carriage and engaging the drive chain.

In small sawmills having a limited production capacity the overhead track for the log holding carriages can, as already mentioned, consist of a single straight portion extending from the input side to the output side, and the drive line or drive chain is then drivable in both directions so that it can move the two log holding carriages to and fro along the track and the two log holding arms are pivoted to their associate log holding carriages in such a way that they can be swung between a substantially vertical working position and raised position, in which the log holding arms are disposed at a substantial distance above the sawing line.

In larger sawmills for a high production capacity, however, the overhead track for the log holding carriages is preferably, as also already mentioned, designed as a closed circuit for the carriages comprising a first straight portion extending parallel to the sawing line from the input side to the output side and a second portion extending from the output side back to the input side at the one side of the saw or saws respectively, that is at the one side of the vertical plane comprising the sawing line. In this case the endless drive member for the log holding carriages is running along the track in its entire length and is continuously driven in the direction corresponding to the direction from the input side to the output side, that is corresponding to the sawing direction.

Such an embodiment of the invention comprises preferably a plurality of log holding devices each including a fore log holding carriage with a fore log holding arm and a rear log holding carriage with a rear log holding arm, whereby the endless drive line or drive chain common to all log holding carriages can propel the log holding devices along the track in a closed circuit one after the other. In such an embodiment the logs can consequently be fed through the saw or saws in an unbroken succession and several logs can at one and the same time be supported in each one log holding device and be moved forward in the sawing line. This is particularly advantageous in large sawmills, which comprise several saws disposed one after the other along the sawing line and in which it is consequently possible to saw several logs at the same time. In this case the rear log holding carriages of the different log holding devices are preferably so designed that also these rear log holding carriages can be disconnected from the common endless drive member. In this way it is achieved that the spacing between consecutive logs in the sawing line can be kept constant, even if the length of the different logs is varying. This will further increase the production capacity. The coupling devices on the rear log holding devices are preferably of the same self-locking and unidirectional type as the coupling devices on the fore log holding carriages, but are so designed as to prevent a displacement of the rear log holding carriages relative to the common drive member in a direction opposite to the direction of movement of the drive member and so that they can be released or made inoperative by means of control means stationarily arranged along the track for the log holding carriages.

In the following the invention will be further described with reference to the accompanying drawing.

Figure 2:
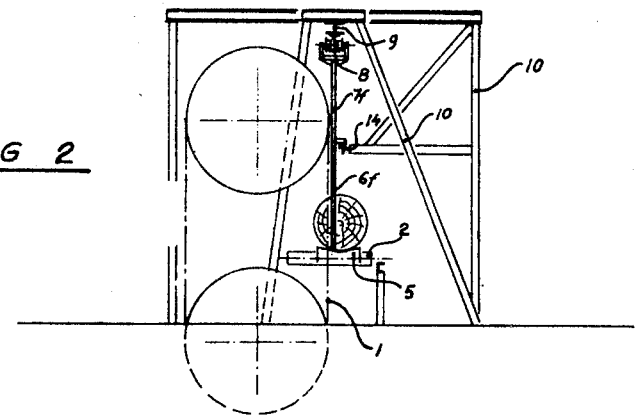

FIGS. 1 to 4 of the drawing illustrate an embodiment of the invention for a small sawmill having a limited production capacity;

FIG. 1 being a side view of the sawmill,

FIG. 2 a cross section through the sawmill along the line II—II in FIG. 1;

FIG. 3 a side view on an enlarged scale of the fore log holding carriage and

Figure 4:
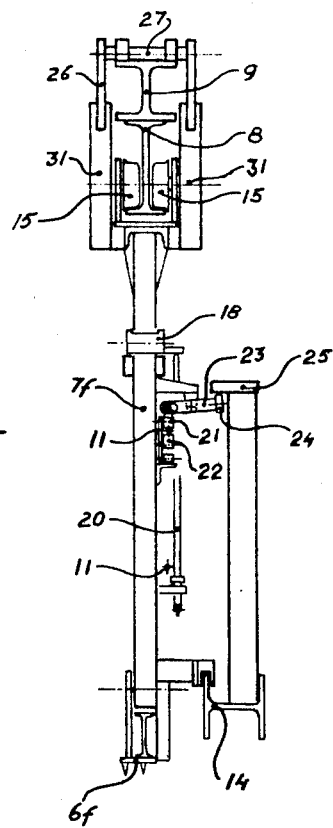

FIG. 4 a vertical section along the line IV—IV in FIG. 3.

Figure 7:
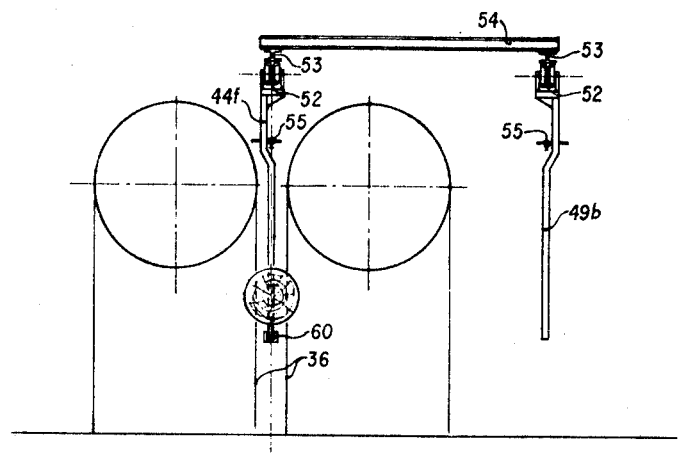
Figure 8:
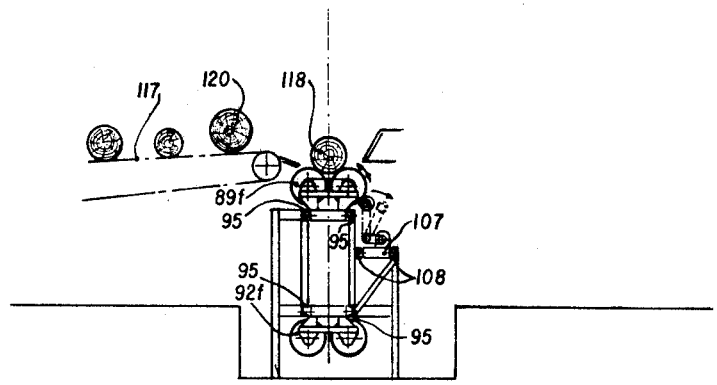
Figure 9:
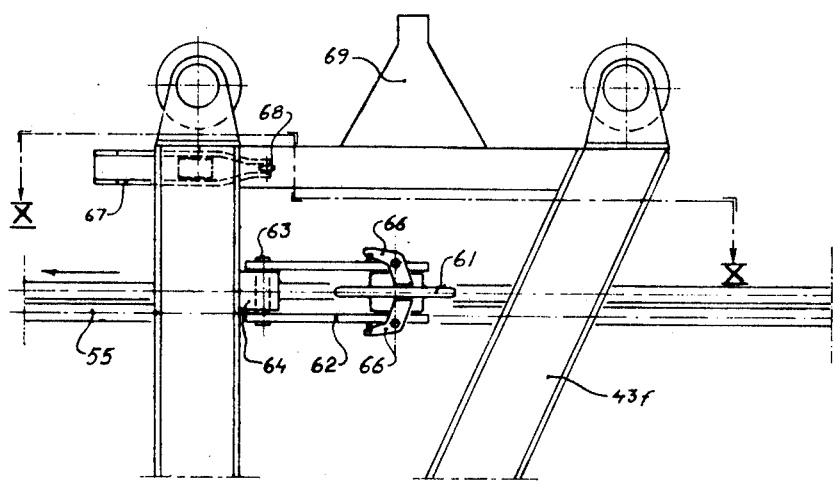
Figure 10:
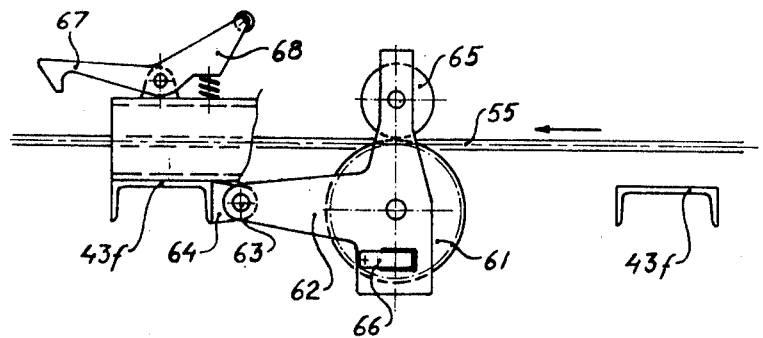
Figure 11:
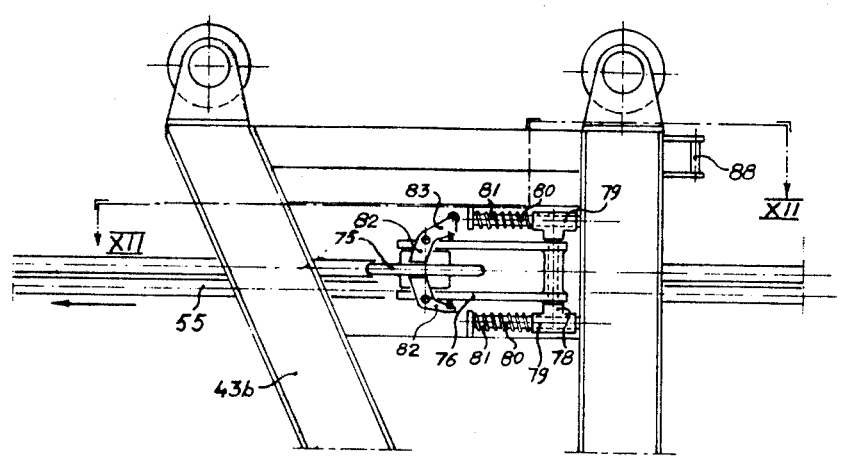
Figure 12:
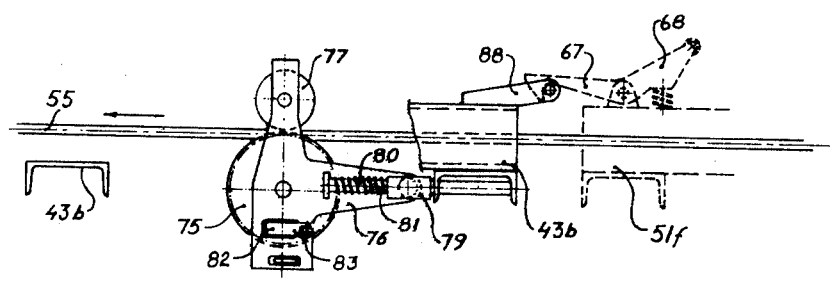
Figure 13:
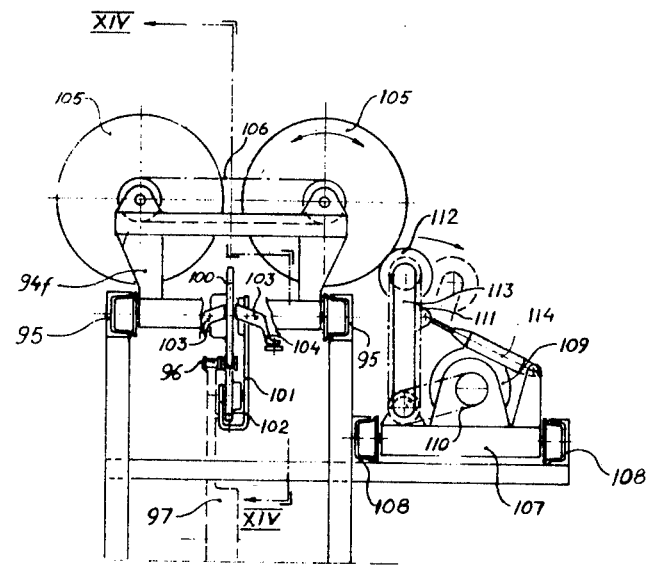
Figure 14:
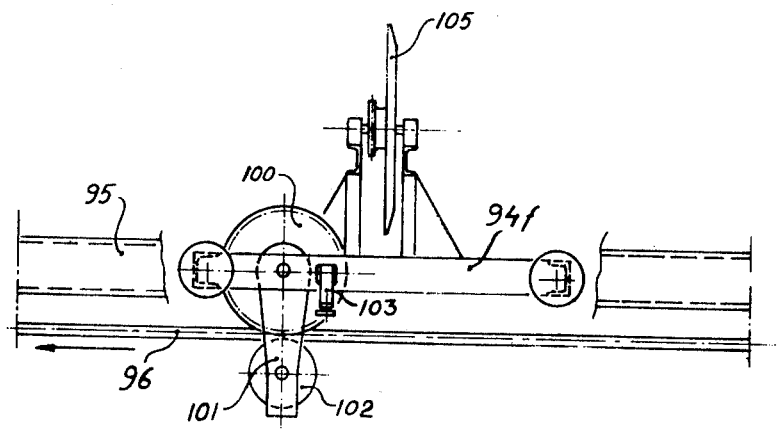

FIGS. 5–14 illustrate another embodiment of the invention for a larger sawmill having a high production capacity;

FIGS. 5a and 5b being a side view of the sawmill,

FIGS. 6a and 6b a top view of the sawmill, in which the uppermost portion of the log holding carriages and the track for them have been omitted for the sake of clearness;

FIG. 7 a vertical section along the line VII—VII in FIG. 5;

FIG. 8 a vertical section along the line VIII—VIII in FIG. 5;

FIG. 9 a side view on an enlarged scale of a portion of a fore log holding carriage, FIG. 10 a section through a fore log holding carriage along the line X—X in FIG. 9;

FIG. 11 a corresponding side view on an enlarged scale of a rear log holding carriage, FIG. 12 a section through this log holding carriage along the line XII—XII in FIG. 11;

FIG. 13 a section on an enlarged scale through the log supplying device along the line XIII—XIII in FIG. 5, and FIG. 14 a section through a log supplying carriage along the line XIV—XIV in FIG. 13.

The sawmill according to the invention shown by way of example in FIGS. 1–4 includes a single-blade band saw 1. For the supply of logs to the saw 1 there is at the input side of the saw a length conveyor consisting of rollers 2, on which a log can be conveyed to the saw from the left in FIG. 1. The logs may, however, also be supplied to the saw by means of a traverse conveyor, not shown in the drawing, which delivers the logs one by one onto the rollers 2. At the output side of the saw there is a similar length conveyor consisting of rollers 3, on which the sawed logs and the side cuts can be discharged from the saw mill. Also at the output side there may be a traverse conveyor not shown in the drawing for removing the side cuts from the rollers 3 to the one side. For the alignment of the logs in the sawing line at the input side the sawmill is provided with a number of elevatable tables 4 provided with support plates 5, on which a log supplied to the sawmill on the rollers 2 will rest, when the tables 4 are raised. The plates 5 have such a shape that a log supported on them can be rotated about its longitudinal axis to a preferred position.

For supporting and feeding the logs, when they are being sawed in the saw 1, the sawmill is provided with a fore log holding arm 6f and a rear log holding arm 6b engaging the fore end surface and the rear end surface respectively of the log and holding and supporting the log between themselves. The fore log holding arm 6f is mounted on a fore log holding carriage 7f, whereas the rear log holding arm 6b is mounted on a similar rear log holding carriage 7b. The two log holding carriages are supported by and individually movable along a stationary overhead track consisting of an I-shaped beam 8 extending above the saw 1 from its input side to its output side straight above and parallel to the sawing line through the saw. The track beam 8 is attached to a similar I-shaped support beam 9, which is supported by support posts 10. The log holding carriages 7b and 7f are propelled by an endless drive line 11, which is running over pulleys 12 and 13 at the ends of the track 8 and its extending parallel to the track. One of the pulleys 12 and 13 is coupled to driving means not shown in the drawing, which can drive the drive line 11 alternately in the one or the other direction. Stationary guide beams 14 for the log holding carriages 7b and 7f are arranged parallel to and somewhat lower than the track beam 8. The guide beams 14 will take up any traverse forces acting upon the log holding carriages.

The design of the log holding carriages and the log holding arms mounted thereon can be seen in FIGS. 3 and 4, which show the fore log holding carriage 7f and the fore log holding arm 6f mounted thereon in detail and on an enlarged scale. The rear log holding carriage 7b and the associated rear log holding arm 6b are substantially of the same design as the fore log holding carriage with the fore log holding arm, except that the rear log holding carriage 7b is permanently connected to the upper part of the drive line 11, whereas the fore log holding carriage 7f is provided with a special coupling device to be further described in the following, by which the carriage can be connected to and disconnected from the drive line 11.

As will be seen in FIGS. 3 and 4 the log holding carriage 7f is running with two wheel-pairs 15 on the lower flange of the I-shaped track beam 8. The log holding arm 6f is pivoted to the lower end of the log holding carriage 7f in such a way that it can be swung between the vertical working position shown in FIG. 1 and a horizontal return-position shown in FIGS. 3 and 4. The log holding arm 6f is swung by means of an operating cylinder 16 and in its vertical working position the log holding arm 6f is locked by a latch 18 engaging the upper end 17 of the log holding arm. When the log holding arm 6f is swung by the operating cylinder 16 from the horizontal return-position to the vertical working position, a cam 19 attached to the outer end of the piston rod of the operating cylinder 16 will bear against the lower end of a rod 20, which will then be displaced upwards and temporarily raise the latch 18 so that the upper end 17 of the log holding arm 6f can be engaged by the latch 18 and be locked in its vertical position. When the log holding arm 6f is swung back from its vertical working position to its horizontal return-position, the cam 19 will once more displace the rod 20 so that the latch 18 is temporarily lifted to release the log holding arm. In the above described respects the fore log holding carriage 7f with the log holding arm 6f and the rear log holding carriage 7b with the log holding arm 6b are identical.

For the connection of the fore log holding carriage 7f to the upper part of the drive line 11 the log holding carriage is provided with a coupling device consisting of two clamp jaws 21 and 22 bearing against opposite sides of the drive line 11. The clamp jaws are so arranged and interconnected that the will automatically pinch the drive line 11, if the log holding carriage 7f tries to move in the sawing direction, that is to the right in FIGS. 1 and 3, relative to the upper part of the drive line 11, whereby the log holding carriage 7f is automatically locked to the drive line 11. The clamp jaws 21 and 22 do not, however, prevent a displacement of the log holding carriage 7f in the opposite direction, that is to the left in FIGS. 1 and 3, relative to the upper part of the drive line 11. A lever 23 is coupled to the upper clamp jaw 21. The outer end of this lever carries a roller 24, which can cooperate with a stationary cam path 25, which will affect the roller 24 in such a way that the lever 23 is pivoted and raises the upper clamp jaw 21, whereby the coupling device is made inoperative, so that the upper part of the drive line 11 can move in the one as well as in the other direction without propelling the log holding carriage 7f. The stationary cam path 25 is situated at the input side of the saw 1 in the position to be occupied by the fore log holding carriage 7f, when a new log is to be gripped in the log holding device. When the fore log holding carriage 7f is brought into this position, shown in solid lines in FIG. 1 and in dotted lines in FIG. 3, the carriage will consequently be automatically disconnected from the drive line 11 and remain disconnected so long as the cam path 25 is engaging the control lever 23 for the upper clamp jaw 21. In this position along the track a retaining pawl 26 is mounted on the support beam 9. The retaining pawl 26 is pivotal about a pin 27, which is displaceable in an elongated slot 28. The retaining pawl 26 is connected to the beam 9 by a spring 29. The beam 9 carries further a cam path 30 at some distance in front of the forward end of the retaining pawl 26. If the retaining pawl 26 is moved against the action of the spring 29 a sufficient distance to the right in FIGS. 1 and 3, that is in the sawing direction, the cam path 30 will engage the retaining pawl and raise it about the pin 27. The fore log holding carriage 7f is provided with triangular beam members 31 projecting upwards on both sides of the track beam 8 and these beam members 31 will engage the retaining pawl 26 on both sides of the beam 9, when the log holding carriage 7f is brought into a position straight below the retaining pawl 26.

The sawmill operates in the following manner. When a new log arrives on the rollers 2, the fore end of the log is moved by the roller against an elevatable stop plate 32. Thereafter the log 33 is raised from the rollers 2 by means of the elevatable tables 4 so that the log will rest upon the support plates 5 with its longitudinal axis disposed in the sawing line throufh the saw 1. Resting upon the support plates 5 the log 33 is rotated about its longitudinal axis to a preferred position. At this stage the fore log holding carrage 7f is in the position shown in solid lines in FIG. 1 and in broken lines in FIG. 3, that is the log holding carriage 7f is engaged by the retaining pawl 26 and is also disconnected from the drive line 11, as the stationary cam path 25 is engaging the control level 23 for the upper clamp jaw 21. The fore log holding arm 6f is however in the raised horizontal position shown in FIGS. 3 and 4. The rear log holding carriage 7b permanently connected to the upper part of the drive line 11 is positioned near to the left-hand end of the track beam 8 and has also its associated rear log holding arm 6b raised in its horizontal return position. At this stage the drive line 11 is not moving.

When the log 33 has been aligned in the preferred position on the support plates 5, the stop plate 32 is lowered and the two log holding arms 6f and 6b are swung downwards to their vertical working positions. The fore log holding arm 6f will then bear against the fore end surface of the log 33. At the same time the drive line 11 is started so that its upper part is moving in the sawing direction, that is to the right in FIGS. 1 and 3, whereby the rear log holding carriage 7b is propelled in the same direction and the rear log holding arm 6b is moved towards the rear end surface of the log 33. The fore log holding carriage 7f remains however stationary, as it is disconnected from the drive line 11 and is kept in its position by the retaining pawl 26. When the rear log holding arm 6b reaches the rear end surface of the log 33 it will start to push the log 3 forwards in the sawing direction.

The support plates 5 are movable in the sawing direction relative to the elevatable tables 4. The log 33 will then push the fore log holding arm 6f and the associated fore log holding carriage 7f forwards along the track beam 8 against the action of the spring 29 connected to the retaining pawl 26. In this way the log is gripped between the two log holding arms 6f and 6b by a gripping force, which corresponds to the force from the spring 29 and which consequently increases, when the fore log holding carriage 7f is displaced in the sawing direction. When the fore log holding carriage 7f is displaced in this way, the roller 24 will leave the cam path 25, whereby the control lever 23 for the upper clamp jaw 21 returns to its normal position and the clamp jaw 21 is released to bear against the upper part of the drive line 11. This does not cause, however, that the fore log holding carriage is immediately connected to the drive line 11, as the clamp jaws 21 and 22 permit the upper part of the drive line 11 to move relative to the log holding carriage 7f in the sawing direction, that is to the right in FIGS. 1 and 3. When the log holding carriage 7f is pushed in the sawing direction, the forward end of the retaining pawl 26 will reach the stationary cam path 30 and this will raise the retaining pawl 26 about the pin 27 so that the fore log holding carriage 7f is released by the retaining pawl 26. The fore log holding carriage 7f will then try, under the influence of the gripping force for the log 33 previously generated by the spring 29, to move relative to the upper part of the drive line 11 in the sawing direction, that is to move at a higher velocity in the sawing direction than the drive line. As already described, the two clamp jaws 21 and 22 will then automatically clamp the upper part of the drive line 11 and instantly lock the fore log holding carriage 7f to the drive line 11. The fore log holding carriage 7f and the fore log holding arm 6f will consequently be brought along by the drive line with the log 33 clamped between the two log holding arms 6f and 6b with a force corresponding to the force generated by the spring 29 at the instant of release. This clamping or gripping force is now taken up by the upper part of the drive line 11. The log 33 will consequently be moved through the saw 1 supported between the log holding arms 6f and 6b so that the saw 1 can make a cut through the log. When the log has been gripped between the two log holding arms 6f and 6b the tables 4 are lowered again. When the log has passed through the saw 1 and the log holding carriages 7f and 7b reach the positions shown in dotted lines in FIG. 1 at the output side of the saw, the drive line 11 is stopped and the log holding arms 6f and 6b are raised to their horizontal return-positions, whereby the sawed log is released and falls down onto the conveyor rollers 3 to be discharged from the sawmill.

Thereafter the drive line 11 is started in the opposite direction, that is with its upper part moving to the left in FIGS. 1 and 3, whereby the rear log holding carriage 7b as well as the fore log holding carriage 7f, due to the operation of the clamp jaws 21 and 22 described above, are propelled by the drive line 11 to the input side of the saw 1. During this return movement the log holding arms 6f and 6b are, however, raised in their horizontal position so that they do not obstruct the sawing line during the return movement. A new log can consequently be supplied to the input side of the saw on the rollers 2, as soon as the foregoing log 33 has left the position, in which it was gripped by the log holding arm, and this new log can be aligned on the support plate 5 so that it is ready to be gripped by the log holding arms 6f and 6b, when the log holding carriages return to their starting positions. When during the return movement the fore log holding carriage 7f reaches its starting position, the roller 24 on the control lever 23 is once more engaged by the cam path 25 so that the log holding carriage 7f is disconnected from the drive line 11 at the same time as it engages the retaining pawl 26. The movement of the drive line 11 is however, continued until the rear log holding carriage 7b reaches the left hand end of the track 8 or at least is moved so far towards this end that it is located behind the rear end of the new log, which has been aligned on the support plates 5.

The sawed logs discharged at the output side of the saw can by suitable conveyor means, not shown in the drawing, be returned to the input side of the saw for further cutting. As the log holding arms 6f and 6b are removed from the sawing line through the saw 1 during their return movement, it is possible, when desired, to saw logs in the saw 1 during this time by feeding the logs through the saw 1 by means of feed rollers 34, which press a previously sawed and consequently plane side of the log against a guide member 35 guiding the log in the traverse direction during the sawing so that an accurate cut is made. In a sawmill of this type it is consequently possible at first to saw a log plane on one or several sides by feeding the log through the saw 1 supported between the log holding arms 6f and 6b and thereafter to make the remaining cuts through the log by feeding the log through the saw 1 by means of the feed rollers 34 and the guide member 35. This kind of operation is particularly advantageous for sawmills having a comparatively limited annual production, as the investment costs for the sawmill will be small.

In order to prevent that the clamp jaws 21 and 22 damage the drive line 11 the portion of the drive line 11 cooperating with the clamp jaws 21, 22 can be replaced with a stiff rod of a suitable resistant material. As will be clear from the above description, this portion of the upper part of the drive line 11 is not running over any of the line pulleys 12 and 13.

The sawmill according to the invention shown in FIGS. 5–14 includes a double-blade band saw 36, which can consequently make two cuts at the same time through a log fed through the saw. At the output side of the saw 36 there are two rows of screw rollers 37 and 38 respectively, upon which the boards cut away from the log by the saw 36 fall down and are transferred to the side to each one traverse conveyor 39 and 40 respectively. After the screw rollers there is a table 41, onto which the sawed log is released and from which the log is removed by a traverse conveyor 42. For the supply of new logs to the input side of the saw 36 there is a special log supplying device, which will be described in detail in the following.

Contrary to the sawmill according to the invention shown in FIGS. 1–4 and described in the foregoing, the sawmill shown in FIGS. 5–14 comprises several, more exactly nine, log holding devices. Each log holding device consists, however, as before of a rear log holding arm attached to a rear log holding carriage and a fore log holding arm attached to a fore log holding carriage. The log holding carriages and associated log holding arms are in principle designed in the same manner as in the sawmill previously described, with the difference, however, that in the sawmill according to FIGS. 5 to 14 the log holding arms are rigidly attached to the associated log holding carriages. In FIGS. 5–14 therefore a log holding carriage and the associated vertical log holding arm are provided with a common reference numeral and the fore and the rear log holding carriages in a cooperating pair of log holding carriages are provided with the same reference numerals with the character f added for the fore log holding carriage and the character b added for the rear log holding carriage.

The nine pairs of fore and rear log holding carriages have the following reference numerals: 43f–43b, 44f–44b, 45f–45b, 46f–46b, 47f–47b, 48f–48b, 49f–49b, 50f–50b and 51f–51b. These log holding carriages are supported by and movable along an overhead track consisting of a stationary I-shaped beam 52. Contrary to the previously described sawmill this track beam is, however, formed as a closed circuit for the log holding carriages, comprising a straight portion disposed straight above and parallel to the sawing line through the saw 36 and extending from the input side to the output side of the saw and a portion extending from the output side back to the input side at the one side of the saw 46, as most readily seen in FIG. 6, where the extension of the track beam 52 is schematically illustrated by a dash-dotted line. The I-shaped track beam 52 for the log holding carriages is attached to a similar I-shaped support beam 53 mounted on cross beams 54. The log holding carriages are propelled by an endless double-chain 55 extending parallel to the track beam 52 and running with its one half over chain wheels 56 and 57 at the turning points for the track 52 for the log holding carriages and over any additional, necessary chain wheels not shown in the drawing. One of the chain wheels 56, 57 is coupled to driving means driving the chain 55 continuously in the direction indicated by the arrow 58 in FIG. 5, that is in the sawing direction. The other half of the double drive chain 55 is used for the connection of the log holding carriages to the drive chain, as will be described more in detail in the following. When the log holding carriages are moving in the sawing line of the saw, they are guided in the traverse direction by stationary guide rails 59 on both sides of the path of movement of the log holding carriages at the input side and the output side of the saw. Adjacent the saw 36 there is instead of such guide rails a guide groove 60, in which the lowermost ends of the log holding carriages can run, when the logs supported between the log holding carriages are being sawed, so that very accurate cuts can be made through the logs.

The design of the log holding carriages is shown in detail in FIGS. 9–12, in which FIGS. 9 and 10 show a fore log holding carriage, for instance 43f, and FIGS. 11 and 12 show a rear log holding carriage, for instance 43b. The fore log holding carriage shown in FIGS. 9 and 10 is provided with a coupling device for connection of the carriage to the drive chain 55. This coupling device consists of a chain wheel 61 mounted for rotation about a vertical axis in a chain wheel holder 62, which is pivoted about a vertical shaft 63 mounted in a bracket 64 on the log holding carriage 43f. The chain wheel 61 is engaging the half of the double drive chain 55 not running over the chain wheels 56, 57, and the chain is prevented from disengaging the chain wheel 61 by a guide wheel 65 also mounted in the chain wheel holder 62. The chain wheel holder 62 carries further two clamp jaws 66, which are spring-loaded and bear against opposite sides of the chain wheel 61. Upon rotation of the chain wheel in the one direction the clamp jaws 66 will obviously automatically pinch the chain wheel 61 and lock it, whereby the log holding carriage 43f is locked to the drive chain 55. The clamp jaws 66 permit, however, rotation of the chain wheel 61 in the opposite direction. The fore log holding carriage 43f is consequently free to move relative to the drive chain 55 in the sawing direction, which is indicated by an arrow in FIGS. 9 and 10, whereas it will be automatically locked to the drive chain, if it tries to move relative to the drive chain 55 in the sawing direction. At its fore end in the sawing direction, the fore log holding carriage 43f is provided with a spring-loaded coupling hook 67 provided with an operating lever 68. The object of this coupling hook 67 will be further described in the following. Furthermore the fore log holding carriage 43f is, as in the previously described embodiment of the invention, provided with triangular members 69 projecting upwards from the carriage on both sides of the track beam for the carriage. In a predetermined position at the input side of the saw 36, in which position the log holding carriage 43f is shown in FIG. 5, the member 69 of a fore log holding carriage propelled along the track 52 will automatically be engaged by a retaining pawl 70 mounted on the supporting beam 53. The retaining pawl 70 is designed and operates in principle in the same way as the retaining pawl 26 in the embodiment of the invention shown in FIGS. 1–4 and described above. The retaining pawl 70 is consequently pivoted about a pin 71, which is displaceable in an elongated slot 72, and is further connected to the supporting beam 53 by means of a spring 73. In front of the retaining pawl 70 there is a cam path 74 mounted on the supporting beam 53. This cam path will raise the retaining pawl 70, when this is displaced against the action of the spring 73 in the sawing direction along the supporting beam 53.

The coupling device for the connection of the rear log holding carriage 43b shown in FIGS. 11 and 12 to the drive chain 55 is designed in principle in the same way as the coupling device for the fore log holding carriages and comprises consequently a chain wheel 75 mounted for rotation about a vertical axis in a chain wheel holder 76 and engaging one half of the drive chain 55. The chain wheel holder 76 carries also a guide wheel 77 without teeth, which keeps the drive chain in engagement with the chain wheel 75. The chain wheel holder 76 is pivoted about a vertical shaft 78 mounted in two sleeves 79, which are displaceable along two rods 80 attached to the log holding carriage 43b against the action of coil springs 81 mounted on these rods. The chain wheel holder 73 carries also two clamp jaws 82 bearing against opposite sides of the chain wheel 75. The clamp jaws are so arranged that they will automatically pinch the chain wheel 75 and lock it, when the chain wheel 75 tries to rotate in the one direction, whereas they permit a rotation of the chain wheel in the opposite direction. As seen in the drawing, the clamp jaws 82 will automatically lock the chain wheel 75 and thereby lock the log holding carriage 43b to the drive chain 55, if the log holding carriage tries to move relative to the drive chain 55 in opposite direction to the sawing direction indicated by an arrow in FIGS. 11 and 12, whereas the carriage is free to move relative to the drive chain 55 in the sawing direction. The object of the springs 81 is only to damp the coupling shocks occurring when a stationary carriage is instantly coupled to the continuously driven chain 55.

The upper clamp jaw 82 is provided with an upwards projecting operating lever 83, which can cooperate with stationary cam paths arranged along the track for the log holding carriages in such a way that the upper clamp jaw 82 is lifted from the chain wheel 75, whereby the coupling device is made inoperative and the log holding carriage is disconnected from the drive chain 55. As can be seen in FIGS. 5 and 6, there is a plurality of such stationary cam paths for the coupling devices on the rear log holding carriages arranged along the track 52. A first cam path 83 is located at the end of the portion of the track 52 parallel to the sawing line immediately before the chain wheel 56. This cam path 83 is stationary and will consequently always engage the operating lever 83 on a rear log holding carriage propelled to this position so that the carriage is disconnected from the drive chain and is stopped in this position. A second similar cam path 84 is arranged along the track 52 at a distance before the cam path 83 corresponding to the length of the logs to be sawed in the sawmill. This cam path 84 is displaceable by means of an operating cylinder 85 between an active position shown in solid lines in FIG. 5 and an inactive position shown in dotted lines. A third similar cam path 86 is, as shown with dotted lines in FIG. 6 arranged along the track 52 immediately before the chain wheel 57 that is immediately before the beginning of a straight portion of the track 52 parallel to the sawing line. Also this cam path 86 is in the same way as the cam path 84 displaceable between an operative and an inoperative position. One or several additional similar cam paths 87 may be arranged at a suitable distance before the cam path 86, as shown in dotted lines in FIG. 6.

Each rear log holding carriage is further, as shown in FIGS. 11 and 12, at its rear end in the sawing direction provided with a coupling eye 88, which can cooperate with the coupling hook 67 on the following fore log holding carriage so that a rear log holding carriage is automatically coupled together with the following fore log holding carriage, when the following fore log holding carriage is coming up with the foregoing rear log holding carriage, as shown in FIG. 12 for the rear log holding carriage 43b and the following fore log holding carriage 51f.

For the supply of logs to the log holding carriages at the input side of the saw in a rapid and unbroken succession the sawmill is provided with a special log supplying device shown in FIGS. 5, 6, 7, 13 and 14. This log supplying device includes six pairs of log supplying carriages: 89b and 89f, 90b and 90f, 91b and 91f, 92b and 92f, 93b and 93f and 94b and 94f. Each pair of log holding carriages includes a rear log supplying carriage having the character b added to the reference numeral and a fore log supplying carriage having the character f added to the reference numerals. Such a pair of log supplying carriages is intended to support a log between them in that the rear log supplying carriage supports the rear end of the log whereas the fore log supplying carriage supports the fore end of the log. All log supplying carriages are movable one after the other along an endless track forming a closed circuit for the carriages. This track consists of two parallel U-shaped beams 95, in which the wheels on the log supplying carriages run. The track 95 for the log supplying carriages is so arranged at the input side of the saw parallel to the sawing line through the saw that the log supplying carriages will, when moving along the upper portion of the track 95, move the logs supported by the carriages in the prolongation of the sawing line. The track 95 is extended into the space below the straight, to the sawing line parallel portion of the track 52 for the log holding carriages a distance at least corresponding to the length of the longest log to be sawed and has an extension outside said portion of the track 52 over a distance, which also corresponds at least to the length of the longest log to be sawed. The log supplying carriages are driven by an endless double drive chain 96 running parallel to the track 95 in its entire length over chain wheels 97 and 98 at the turning points of the track. One of the chain wheels 97, 98 is in a manner not shown in detail in the drawing coupled to a drive motor, which drives the chain 96 continuously in the direction indicated by an arrow 99 in FIG. 5.

Each log supplying carriage is provided with a coupling device cooperating with the drive chain 96. This coupling device is, as shown in detail in FIGS. 13 and 14, in principle of the same design as the coupling devices on the log holding carriages. The coupling device includes consequently a chain wheel 100, which is mounted for rotation in a chain wheel holder 101 attached to the frame of the carriage and is engaging the half of the double drive chain 96 not running over chain wheels 97 and 98. The chain wheel holder 101 carries also a guide wheel 102 preventing the drive chain 96 from disengaging the chain wheel 100. Two spring-loaded clamp jaws 103 bear against opposite sides of the chain wheel 100. The clamp jaws 103 are so arranged that they are self-locking in the one direction, that is they pinch automatically the chain wheel 100, when this tries to rotate in the one direction, whereas they permit a rotation of the chain wheel 100 in the opposite direction. The coupling device will consequently automatically lock the log supplying carriage to the drive chain 96, if the carriage tries to move relative to the drive chain 96 in the direction opposite to the direction of movement of the drive chain, indicated by an arrow in FIG. 14. The coupling device permits, however, the log supplying carriage to move relative to the drive chain 96 in the opposite direction, that is in the moving direction of the drive chain. As can be seen in FIG. 13, the one clamp jaw 103 is provided with a projecting operating lever 104, which can cooperate with stationary cam paths arranged along the track for the log supplying carriages in such a way that the associated clamp jaw 103 is lifted from the chain wheel 100, whereby the coupling device is made inoperative and the log supplying carriage is positively disconnected from the drive chain 96. For the sake of clearness these stationary cam paths for the coupling devices on the log supplying carriages are not shown in the drawing, but there is at least one such cam path at the portion of the track 95, where the log supplying carriages 94b and 94f are shown in FIG. 5, an additional such cam path in the position along the track 95, in which the log supplying carriage 89b is shown in FIG. 5, and at least a third such cam path in the position along the track 95, in which the log supplying carriage 89f is shown in FIG. 5. The last-mentioned cam path has a length in the direction of the track 95 at least corresponding to the variations in the length of the various logs to be sawed. Each one of these cam paths is so designed that it can be displaced between an operative and an inoperative position that is similar to the previously described, corresponding cam path 84 for the coupling devices on the rear log holding carriages.

Each log supplying carriage is, as most readily seen in FIGS. 13 and 14, provided with two disks 105, which are mounted for rotation side by side and upon which the log supported by the log supplying carriage is intended to rest. The two disks 105 are rotatable in both directions and coupled to each other, for instance through a chain 106, in such a way that they always rotate in the same direction. By rotation of the two support disks 105 it is consequently possible to rotate a log resting upon them about its longitudinal axis. The log supplying carriages are not, however, provided with any drive means for the support disks 105. For the rotation of the support disks 105 on a log supplying carriage in the one or the opposite direction there is instead provided a special carriage 107, which is movable along a track consisting of two mutual parallel U-beams 108, in which the wheels of the carriage 107 run and which extend parallel to the track 95 for the log supplying carriages at the rear portion of this track 95, as mostly readily seen in FIGS. 6 and 13. The carriage 107 carries a reversible drive motor 109, which is coupled to a drive wheel 112 through chains 110 and 111. The drive wheel 112 is mounted at the free end of a swingable arm 113. The arm 113 can by means of an operating cylinder 114 be swung between an inactive position for the drive wheel 112, shown in dotted lines, and an active position for the drive wheel 112, shown in solid lines. In its active position the drive wheel 112 is bearing against the one support disk 105 on a log supplying carriage positioned beside the carriage 107 and by driving the motor 109 on the carriage 107 in the one or the other direction it is consequently possible to rotate the support disks on the adjacent log supplying carriage in the one or the other direction, whereby a log resting upon this log supplying carriage and a second log supplying carriage can be rotated about its longitudinal axis to a preferred position. The carriage 107 is provided with coupling means not shown in the drawing, as for instance a coupling hook, by means of which the carriage can be coupled to an adjacent log supplying carriage so that the carriage 107 is propelled along its track 108, when the log supplying carriage is moving along its track 95. These coupling means are operated by the operating cylinder 104 so that they are brought in an active position at the same time as the drive wheel 112 and are disengaged from the adjacent log supplying carriage at the same time as the drive wheel 112 is returned to its inactive position. Suitable devices, as for instance springs or counter-weights, not shown in the drawing are arranged automatically to return the carriage 107 to the rear end of its track 108, when the carriage 107 is disengaged from an adjacent log supplying carriage.

For the supply of logs to the log supplying carriages on the track 95 a traverse conveyor 107 is provided, which can deliver a log at a time to a pair of log supplying carriages.

The entire sawmill can be supervised by a single man, who has a seat 115 at the rear end of the track for the log supplying carriages. In front of the seat for the sawmill operator there is a control stand 116 comprising control means, as push buttons or levers, for the control of all operations in the sawmill that are not completely automatic.

In continuous operation the sawmill operates in the following manner. At the stage shown in FIGS. 5 and 6 a log 118 has just been delivered by the traverse conveyor 117 down onto the two log supplying carriages 89b and 89f, which are at this stage disconnected from the drive chain 96 by two of the previously mentioned stationary cam paths along the track 95 and are consequently stationary. As soon as the log 118 is resting on the log supplying carriages 89b and 89f, said cam paths are moved to an inoperative position either automatically controlled by means activated by the log 118 delivered to the log supplying carriages or manually controlled by the sawmill operator. Thereby the log supplying carriages 89b and 87f are instantly connected to the drive chain 96 and begin to move together with the supported log 118 in the sawing direction along the track 95. The continuously driven drive chain 96 has preferably substantially the same velocity as the continuously driven drive chain 55 for the log holding carriages. The drive chain 96 can however also have a somewhat smaller velocity.

When the rear log supplying carriage 89b starts to move, it will bring the adjacent carriage 107 along, which has simultaneously or already previously been coupled to the log supplying carriage 89b in the manner already described, wherefore the drive wheel 112 on the carriage 107 is also in its active position and consequently bearing against the one support disk 105 on the log supplying carriage 89b. The coupling of the carriage 107 to the log supplying carriage 89b can be performed either automatically, for instance at the same time as the carriage 89b reaches the position shown in FIGS. 5 and 6, or manually controlled by the sawmill operator. When the log 118 is moved along the track 95 by the carriages 89f and 89b, the sawmill operator starts by operation of control means in the control stand 116 the motor 109 on the carriage 107 in the one or the other direction so that the log 118 supported by the support disks 105 on the two log supplying carriages is rotated about its longitudinal axis to a preferred position.

When the rear end of the log 118 passes a predetermined point along the track 95, the cam path 86 is temporarily moved to an inoperative position either automatically or by the control of the sawmill operator. This cam path is normally in its operative position and has therefore in the previously described manner disconnected a rear log holding carriage 51b propelled to this position by the drive chain 55 from the chain, wherefore this log holding carriage 51b has been stationary for some time opposite the cam path 86. As will be described more in detail in the following the fore log holding carriage 50f is coupled to this rear log holding carriage 51b by means of the coupling hook 67 and the coupling eye 88 on these two log holding carriages. When the cam path 86 is temporarily moved to an inoperative position, the log holding carriage 51b will consequently be connected to the drive chain 55 again and be propelled by this, whereby the log holding carriage 50f coupled to the log holding carriage 51b is brought along without being connected to the drive chain 55. If an additional cam path 87 is provided, which is then normally also in its operative position and which has consequently also, in the same way as the cam path 86, stopped two coupled log holding carriages, also this cam path 87 is temporarily moved to its inoperative position at the same time as the cam path 86 and will consequently also release the two log holding carriages waiting opposite this cam path 87. These log holding carriages will, however, be stopped again by the cam path 86, as the cam paths 86 and 87 are only temporarily moved to their inoperative position and thereafter returned to their operative positions. The instant at which the cam path 86 is temporarily moved to the inoperative position is so chosen that the two log holding carriages released by the cam path and thereafter driven by the drive chain 55 are advanced to a position immediately behind the rear end of the log 118 moved along the track 95 by the log supplying carriages 89f and 89b. This position is shown in FIGS. 5 and 6 for another log 119 supported by two other log supplying carriages 90f and 90b, to the rear end of which log the rear log holding carriage 43b and the fore log holding carriage 51f coupled thereto have just been advanced.

The log 118 is, as already mentioned, being aligned in its preferred position by means of the carriage 107 at the same time as the log is moved forward along the track 95 by the log supplying carriage 89b and 89f. When the positioning of the log is completed and the carriage 107 is brought close to the forward end of its track 108, the carriage 107 is disengaged from the log supplying carriage 89b either automatically or by the control of the sawmill operator, whereby the carriage 107 is automatically returned to the rear end of its track 108.

At the same time as the log supplying carriages 89b and 89f are connected to the drive chain 96 and start to move the log 118 forward or immediately thereafter, the stationary, previously mentioned cam path, which has hitherto maintained the two log supplying carriages 94f and 94b disconnected from the drive chain 96, is temporarily moved to an inoperative position so that these log supplying carriages are connected to the drive chain 96 and consequently moved forward along the track 95. This cam path can be moved to its inoperative position either automatically, when the foregoing log supplying carriages 89f and 89b are started, or by the control of the sawmill operator. The rear log supplying carriage 94b is disconnected again from the drive chain 96 and consequently stopped, when it reaches the position along the track 95, in which the log supplying carriage 89b is shown in FIGS. 5 and 6, that is immediately in front of the rear end of the logs conveyed by the traverse conveyor 117. These logs have their rear ends aligned. The log supplying carriage 94f, however, is not disconnected from the drive chain 96 and stopped, until it reaches a position along the track 95 immediately before the fore end of the foremost log 120 on the traverse conveyor 117. The two log supplying carriages 94b and 94f can be disconnected from the drive chain and stopped either automatically by means sensing the position of the fore end of the next log 120 on the traverse conveyor 117 or by the control of the saw mill operator.

When the rear end of the log 118 moved forward along the track 95 is spaced a predetermined distance from the fore end of the next log 120 on the traverse conveyor 117, the traverse conveyor 117 is started to deliver the next log 120 to the log supplying carriages 94f and 94b, which have at this moment been advanced and stopped as previously described. The abovementioned distance corresponds to the desired mutual spacing between the logs, when they are fed through the saw. Also this operation can be started automatically or by the control of the sawmill operator.

At the stage of operation shown in FIGS. 5 and 6 a log 119 has, as already mentioned, been propelled by the two log supplying carriages 90f and 90c so far along the track 95 that a rear log holding carriage 43b and a fore log holding carriage 51f coupled thereto have been advanced by the drive chain 55 to a position immediately behind the rear end of the log 119. The fore log holding carriage 43f cooperating with this rear log holding carriage 43b has at this stage just been advanced by the foregoing rear log holding carriage 44b to a position opposite the retaining pawl 70 and has engaged this. In this position along the track 52 for the log holding carriages a cam path, not shown in the drawing, is arranged to affect the control lever 68 for the coupling hook 67 on the fore log holding carriage 43f in such a way that the coupling hook 67 is disengaged from the coupling eye 88 on the foregoing rear log holding carriage 44b. The log holding carriage 43f is consequently in this position disconnected from the log holding carriage 44b, which moves on, however, driven by the drive chain 55, whereas the carriage 43f remains in the position determined by the retaining pawl 70. As the drive chain 96 for the log supplying carriages and the drive chain 55 for the log holding carriages are driven with the same velocity, the log 119 will be moved forward towards the stationary fore log holding carriage 43f at the same rate as the two log supplying carriages 43b and 51f. If the drive chain 96 for the log supplying carriages should have a somewhat lower velocity than the drive chain 55 for the log holding carriages, this will not matter, as the log supplying carriages can move at a higher rate in the direction of movement of the drive chain 96 than the drive chain itself. When the fore end of the log 119 reaches the stationary fore log holding carriage 43f this is also displaced along the track 52 in the sawing direction against the action of the spring 73 connected to the retaining pawl 70. When the retaining pawl 70 reaches the cam path 74, the pawl is lifted in the manner previously described and releases the log holding carriage 43f. This will then try to move forward in the sawing direction at a higher velocity than the drive chain 55, whereby however the coupling device on the log holding carriage 43f will in the manner previously described automatically and instantly lock the log holding carriage to the drive chain 55. The log 119 will consequently thereafter be moved forward in the sawing line gripped between and supported by the two log holding carriages 43b and 43f, which are at this stage both connected to the drive chain 55. The rear log holding carriage 43b will bring the aftergoing fore log holding carriage 51f along, until this engages the retaining pawl 70 and at the same time is disengaged from the log holding carriage 43b.

When a log has been fed through the saw 36 supported by a pair of log holding carriages, it will at the output side of the saw finally reach a position, which in FIGS. 5 and 6 is occupied by a log 121 held between a fore log holding carriage 46f and a rear log holding carriage 46b. At this portion of the track 52 there is, as already mentioned, a stationary, always operative cam path 83, which has actuated the control lever 82 on the foregoing rear log holding carriage 47f and thereby disconnected this carriage from the drive chain 55, due to which this carriage is for the moment stationary in this position. The fore log holding carriage 46f supporting the log 121 is consequently propelled by the drive chain 55 towards the foregoing rear log holding carriage 47b, whereby these two carriages will automatically be coupled together, when the coupling hook 67 on the log holding carriage 46f engages the coupling eye 88 on the log holding carriage 47b. At the same time the log holding carriage 46f, which is still propelled by the drive chain 55, will push the foregoing log holding carriage 47b forwards so that the cam path 83 disengages the control lever 82 on the log holding carriage 47b, whereby this carriage is automatically and instantly connected to the drive chain 55 and is moved forward by the chain, whereby it will drag the aftergoing fore log holding carriage 46f along. Simultaneously the log holding carriage 46f will actuate a switch device 122, which is located along the track 52 and which controls the operating cylinder 85 for the previously mentioned cam path 84, which is then moved by the operating cylinder 85 from its inoperative position to its operative position, in which it actuates the control lever 82 for the coupling device on the rear log holding carriage 46b, whereby this is disconnected from the drive chain 55 and stopped. As the fore log holding carriage 46f is dragged along by the log holding carriage 47b, which is now connected to the drive chain 55, whereas the rear log holding carriage 46b is disconnected from the drive chain and consequently stationary, the log 121 will be released by the two log holding carriages 46f and 46b and fall down onto the table 41, from which the sawed log is removed by the traverse conveyor 42. When the fore log holding carriage 46f is dragged along by the foregoing log holding carriage 47b driven by the drive chain 55, it will actuate an additional switch device 123, which controls the operating cylinder 85 for the cam path 84 so that this is returned to its inoperative position. Due to this the rear log holding carriage 46b is connected again to the drive chain 55 and will be propelled by this to the cam path 83, which will once more disconnect the carriage from the drive chain 55 so that the carriage will be stopped in the position, which in FIGS. 5 and 6 is occupied by the log holding carriage 47b. The log holding carriage 47b and the log holding carriage 46f coupled thereto are moved by the drive chain 55 around the chain wheel 56 and back towards the chain wheel 57. They will, however, be disconnected from the drive chain and stopped by the cam path 86 or already by the cam path 87, if fitted.

I claim:

1. A log sawmill comprising at least one saw unit having at least one vertical saw blade, an input side and an output side and an imaginary sawing line constituting a preferred path of movement from said input side to said output side for a log to be sawed, an overhead track extending above said unit from said input side to said output side parallel to said sawing line, at least one log holding device supported by and movable along said track and including downwardly extending fore and rear log holding arms having lower extremities for engaging the fore end surface and the rear end surface respectively of a log located in said sawing line so as to support and hold the log, a fore log holding carriage supported by and individually movable along said track and supporting said fore log holding arm, a rear log holding carriage supported by and individually movable along said track and supporting said rear log holding arm, an endless drive member common to all log holding carriages extending along said track, each fore log holding carriage comprising coupling means for alternatively connecting and disconnecting said fore log holding carriage to and from said drive member; retaining means located at said input side adjacent said track for engaging and retaining a fore log holding carriage against movement towards said saw unit when disconnected from said drive member and means responsive to the retaining force for automatically releasing a fore log holding carriage retained by said retaining means to be reconnected to said drive member, when said retaining force exceeds a predetermined value.

2. A sawmill as claimed in claim 1 wherein said coupling means on each fore log holding carriage comprises a self-locking and unidirectional coupling device operative between the carriage and said drive member for preventing a displacement of the carriage relative to said drive member in the sawing direction while permitting a displacement of the carriage relative to the drive member in the opposite direction.

3. A sawmill as claimed in claim 2 wherein said coupling device includes clamping jaws acting against said drive member and being self-locking upon a mutual movement in the one direction between said drive member and said fore log holding carriage.

4. A sawmill as claimed in claim 2 wherein said endless drive member comprises a chain and said coupling device on each fore log holding carriage includes a chain wheel mounted for rotation upon said fore log holding carriage and engaging said chain and clamping jaws acting against said chain wheel and being self-locking upon rotation of said chain wheel in the one direction.

5. A sawmill as claimed in claim 1 wherein said endless drive member is drivable in both directions to move said log holding carriages to and along said track between said input side and said output side and said log holding arms are pivoted in the associated log holding carriages so as to be pivotal between a substantially vertical working position with their lower extremities lying in said sawing line and a raised position with their lower extremities disposed at a substantial distance above said sawing line.

6. A sawmill as claimed in claim 1 wherein said track forms a closed circuit for said log holding carriages and includes a first straight portion extending from said input side to said output side parallel to said sawing line and a second portion extending from said output side to said input side at the one side of the vertical plane comprising said sawing line, said endless drive member extending along said track over its entire length and being drivable in one direction only corresponding to a motion from said input side to said output side along said first straight portion of said track.

7. A log sawmill as claimed in claim 6 comprising a plurality of log holding devices, each including a fore log holding arm attached to a fore log holding carriage supported by and individually movable along said track and a rear log holding arm attached to a rear log holding carriage supported by and individually movable along said track, and wherein also each rear log holding carriage is provided with coupling means for alternatively connecting and disconnecting the rear log holding carriage to and from said endless drive member.

8. A sawmill as claimed in claim 7 wherein said coupling means on each rear log holding carriage comprises a coupling device operative between the carriage and said endless drive member so as to be disengageable under the action of stationary disengaging members disposed along said track, a first disengaging member being located at said output side at a distance from said saw unit exceeding the length of the longest log to be sawn, a second disengaging member being located between said first disengaging member and said saw unit at a distance from said first disengaging member corresponding to the length of a log and a third disengaging member being located along said second portion of said track at said input side, said second and said third disengaging members being displaceable between operative and inoperative positions.

9. A sawmill as claimed in claim 8 wherein said coupling device of each rear log holding carriage is of a self-locking, unidirectional type preventing, when not affected by any of said stationary disengaging members, any displacement of the carriage relative to the endless drive member in the direction opposite to the driving direction of the drive member while permitting a displacement of the carriage relative to the drive member in the driving direction of the drive member.

10. A sawmill as claimed in claim 7 wherein each forelog holding carriage and each rear log holding carriage is provided with first and second respectively, co-operating, coupling means for automatically coupling a fore log holding carriage to the forerunning rear log holding carriage on said track, when said fore log holding carriage catches up with said forerunning rear log holding carriage, and stationary means located at said input side adjacent said track for disengaging said coupling.

11. A sawmill as claimed in claim 7 comprising a log supplying device at said input side for supplying logs one by one to said log holding devices, said log supplying device including at least one pair of log supplying carriages, an endless track the two carriages of each pair being capable of supporting one end each of a log and individually movable along said endless track which forms a closed circuit for all log supplying carriages, said endless track having a straight portion parallel to the prolongation of said sawing line at said input side so located with respect to said sawing line that a pair of log supplying carriages can move along said straight portion of said track while supporting a log located in said sawing line or in the prolongation thereof, said straight portion of said track for said log supplying carriages being partially located below said first straight portion of said track for said log holding carriages at said input side, and an endless continuously driven drive member common for all said log supplying carriages running along said track for said log supplying carriages, each log supplying carriage having coupling means for alternatively connecting and disconnecting the log supplying carriage to and from said endless drive member.

12. A sawmill as claimed in claim 11 wherein said coupling means on each log supplying carriage comprises a coupling device operative between the carriage and said endless drive member for said log supplying carriages, so as to be disengageable under the action of stationary disengaging members along said track for said log supplying carriages, at least two such disengaging members being located along said straight portion of said track for said log supplying carriages.

13. A sawmill as claimed in claim 11 wherein each log supplying carriage includes rotatable support members for supporting a log, the sawmill further comprising an additional carriage movable to and from at the one side of and parallel to said straight portion of said track for said log supplying carriage provided with rotating drive means and with coupling means for temporarily coupling said additional carriage to a log supplying carriage and said rotating drive means to said rotatable support means on said log supplying carriage for rotation of said rotatable support members.

References Cited

UNITED STATES PATENTS

| 81,673 | 9/1868 | Orm | 143—105 |
| 295,791 | 3/1884 | Milne | 143—105 |
| 1,633,920 | 6/1927 | Bradford | 143—105 |
| 2,651,335 | 9/1953 | Stagg | 143—105 |
| 3,180,377 | 4/1965 | Pinder | 143—117 |
| 3,224,475 | 12/1965 | Fehr | 143—54 |

DONALD R. SCHRAN, Primary Examiner

U.S. Cl. X.R.

143—54, 105, 117